United States Patent [19]

Opitz et al.

[11] 4,118,184

[45] Oct. 3, 1978

[54] STABLE LIQUID AQUEOUS COMPOSITION OF A WATER-SOLUBLE FIBER-REACTIVE AZO DYESTUFF, CONTAINING A BUFFER SUBSTANCE, THE DYESTUFF HAVING BEEN PREPARED BY DIAZOTIZATION WITH A NITRITE AND COUPLING IN THE ABSENCE OF ACID

[75] Inventors: Konrad Opitz, Liederbach, Taunus; Josef Landler, Hofheim, Taunus; Erhard Worfel, Hattersheim, Main, all of Fed. Rep. of Germany

[73] Assignee: Hoechst Aktiengesellschaft, Frankfurt am Main, Fed. Rep. of Germany

[21] Appl. No.: 807,740

[22] Filed: Jun. 17, 1977

Related U.S. Application Data

[63] Continuation of Ser. No. 653,128, Jan. 28, 1976, abandoned.

[30] Foreign Application Priority Data

Jul. 3, 1975 [DE] Fed. Rep. of Germany ....... 2529657

[51] Int. Cl.$^2$ .................... D06P 1/38; D06P 1/382; D06P 1/384
[52] U.S. Cl. ............................. 8/26; 8/41 R; 8/41 B; 8/42 R; 8/42 B; 8/50; 8/51; 8/76; 8/82; 8/83; 8/92; 8/163; 260/151; 260/153; 260/154; 260/162; 260/163; 260/193; 260/199
[58] Field of Search .................. 8/27, 83, 85, 89, 92, 8/93, 163, 26, 41 R, 42 R, 50, 51, 82; 260/147, 148, 149, 150, 151, 153, 154, 163, 198, 199, 200, 201, 146 D, 146 T; 106/288 Q

[56] References Cited

U.S. PATENT DOCUMENTS

| | | | |
|---|---|---|---|
| 3,100,131 | 8/1963 | Freyermuth et al. | 8/163 X |
| 3,387,914 | 6/1968 | Bohnert et al. | 8/163 X |
| 3,416,876 | 12/1968 | Ohmer | 8/65 X |
| 3,793,305 | 2/1974 | Balon | 260/154 |
| 4,035,350 | 7/1977 | Landler et al. | 260/152 |

FOREIGN PATENT DOCUMENTS

1,060,063  2/1967  United Kingdom ........................ 8/163

OTHER PUBLICATIONS

Bermes, Chemical Abstracts, vol. 77, #76664e (1972).
Raufmann, Chemical Abstracts, vol. 76, 128686q (1972).
Lacroix et al., Chemical Abstracts, vol. 81, 14620m (1974).
Vernikovskaya, Chemical Abstracts, vol. 76, #128797b (1972).

*Primary Examiner*—Floyd D. Higel
*Attorney, Agent, or Firm*—Curtis, Morris & Safford

[57] ABSTRACT

Concentrated dyeing compositions containing up to 45% by weight of one or more metal-free or metal complex azo dyestuffs containing one or more sulfo groups and one or more reactive groups, and containing buffer substances and having a pH of from 3 to 7, which may easily be prepared by diazotization and coupling of stoichiometrical amounts of a diazotizable amino compounds with a stoichiometrical amount of a nitrite and with a coupling component without addition of an acid but with the proviso that at least the diazo or coupling component contain at least one free acid group, such as sulfo group; these compositions are salt-free or practically salt-free and are very well suitable for the preparation of usual dyeing liquors and printing pastes useful in dyeing wool, silks, polyamide fibers and natural or regenerated cellulose.

5 Claims, No Drawings

STABLE LIQUID AQUEOUS COMPOSITION OF A WATER-SOLUBLE FIBER-REACTIVE AZO DYESTUFF, CONTAINING A BUFFER SUBSTANCE, THE DYESTUFF HAVING BEEN PREPARED BY DIAZOTIZATION WITH A NITRITE AND COUPLING IN THE ABSENCE OF ACID

This is a continuation of application Ser. No. 653,128 filed Jan. 28, 1976 now abandoned.

The present invention relates to liquid compositions of fiber-reactive azo dyes.

After having been synthetized, water-soluble reactive dyes are generally isolated by salting them out from the aqueous reaction solution, suction-filtering the precipitated salt-dyestuff mixture and drying the filter cake obtained. Another method used in industry for isolating the dissolved, generally readily water-soluble dyestuff from the solution is by drying it directly, for example by spray-drying the solution.

For the dyeing purpose intended, the salt-containing dyestuff powder is then generally standardized to a determined dyestuff content, following the drying operation, by admixing neutral inorganic salts, for example sodium sulfate.

These conventional powder brands of reactive dyes, however, have a number of drawbacks resulting from the formation of dust of these pulverulent dyestuff compositions when handling them, for example when filling or refilling them in containers, weighing and dosing them or using them to prepare dyeing liquors or printing pastes. This dust formation not only inconveniences the operating personel but may also, when the dust settles down, lead to unpleasant dotty coloration of undyed or already dyed material in the dyeing or printing shops. Alternatively, dust prevention on dyestuff powders using the conventional dust-preventing agents on a mineral oil basis always involves the risk of oily deposits in dyeing and printing, which result in spotty and therefore useless dyeings and prints. Moreover, in many cases, these dyestuff powders constitute an obstacle in industry to desirable rationalization measures such as, for example continuous dyeing process or automatically operated dosing and weighing devices.

These drawbacks are fully overcome according to the present invention, as far as azo dyes are concerned.

We have now found liquid, aqueous compositions of fiber-reactive azo dyes which in the form of the free acid correspond to the formula (I)

$$(HO_3S)_m - F - Z_n \qquad (I)$$

in which F stands for the chromophoric radical of an, especially known, mono-, dis- or trisazo dyestuff or of a metal complex compound thereof with Cu, Cr, Co, Ni or Fe as the complex-forming central atom, Z stands for a fiber-reactive group, $m$ for an integer of 1 or a higher number, for example an integer of 1 to 8 or 1 to 6, especially 1 or 2, and $n$ for an integer of 1 to 3.

Theses dyestuff compositions comprise one or more, e.g. two, three or four, of these dyestuffs of formula (I), preferably the alkali metal salts, especially sodium salts thereof, in an aqueous solution in a concentration of from 5 to 45% by weight, preferably from 15 to 40% by weight, more preferably from 15 to 30% by weight, calculated on the pure dyestuff of formula (I), and have a pH-value of from 3 to 7, advantageously 5.5 to 6.8 and additionally contain one or more, e.g. 2, 3 or 4, buffer substances, preferably 1 to 10, more preferably 1 to 6% by weight thereof.

To all concerned in the production and handling of the dyes, the novel compositions moreover give a fair advantage over dyestuff powder brands, inasfar as they substantially reduce the waste water pollution with salts.

According to this invention, the new liquid dyestuff compositions of formula I are prepared by starting directly from a dyestuff solution optionally clarified, or from a dyestuff suspension which are obtained by a new, hereinafter specified synthesis method; then, for example, the solution is standardized where desired — since this is advantageous — to the desired higher dyestuff content either by concentration, for example by separation of part of the water by distillation in vacuo, or advantageously by addition of a dried, for example spray-dried, portion of the same clarified dyestuff solution obtained by this synthesis, or water is added to the suspension for dissolving the dyestuff to a highly concentrated solution, and finally, at any event, buffer substances are added to this dyestuff solution.

The conventional synthesis method for water-soluble azo dyes, including a diazotization with at least 2 mols of a mineral acid per each mol of diazotizable amine, always results in dyestuffs containing inert salts. This generally prevents the preparation of liquid concentrated compositions of fiber-reactive azo dyes containing only one sulfo group with a dyestuff content that is interesting for industrial use. These industrially interesting, liquid compositions of reactive dyes should possibly have half the tinctorial strength of the conventional powder brands, which means a content of pure dyestuff in the liquid composition of from about 15 to 30% by weight.

Such a dyestuff content may, however, also not be achieved for azo dyes containing 2 or more $SO_3H$-groups; for the solubility of a dyestuff substantially, but not exclusively, depends on the number of $SO_3H$-groups, but also on the molecule size, on the arrangement of the $SO_3H$-groups in the molecule and on the presence of further substituents. Thus, for example, an $SO_3H$-group linked in ortho position with regard to the azo group brings about a poorer solubility than a $SO_3H$-group being farther away from the azo group.

In contradistinction to the known methods, the novel process for the preparation of azo dyes, which improves the above-mentioned preparation of the dyestuff compositions of the invention, permits a reaction of stoichiometrical amounts of an aromatic amine and a coupling component having at least one free acid group in one of the two components, with the stoichiometrical amount of a nitrite in water and/or an organic solvent, but without addition of an acid, while the pH of the reaction mixture, if required, is adjusted, to the optimum for the coupling reaction by means of acid-binding inorganic compounds or buffer substances during or after the addition of the nitrite. This process is disclosed in detail in our copending patent application Ser. No. 653,129 now U.S. Pat. No. 4,035,350.

The solvents used do not contain groups having an acid or basic effect, are miscible with or soluble in water and show a pH of from 6 to 8, preferably from 6.5 to 7.5, in an aqueous solution at 20° C. These solvents include, for example, lower aliphatic alcohols, as alkanols, e.g. methanol, ethanol, n-butanol; lower aliphatic or cycloaliphatic ketones, as alkanones or cycloalkanones, e.g.

diethyl-ketone, acetone, butanone-(2), cyclohexanone; dimethylformamide, N-methyl-pyrrolidone, N-methyl-acetamide, dimethylacetamide, dimethylsulfoxide, dioxan, ethylene-glycol monomethyl ether and phosphoric acid tris-(N-dimethyl)-amide as well as ε-caprolactam.

The diazotization and coupling reactions according to this novel process may be carried out in dilute and concentrated, aqueous, aqueous-organic or organic solutions with organic solvents of the above type. It is, however, advantageous to choose a reaction medium in which the reaction components are present in a highly concentrated form, especially as a suspension in the solvent used, in which part of the two coupling reaction components should be in a dissolved state.

Water is the preferred solvent.

This novel process is most advantageously carried out by preparing a paste of the diazotizable aromatic amine or the coupling component, or the two together, in stoichiometrical amounts, preferably in a finely divided form, with a small amount of water or in another of the solvents or mixtures of solvents, and if required, then adding the other component in a stoichiometrical amount, and finally admixing the calculated equivalent amount of a salt of the nitrous acid, preferably an alkali metal nitrite, for example sodium nitrite, in a solid, advantageously finely divided form. The nitrite may be added in one single portion but advantageously it is added in several portions, since this enables a better temperature check. The temperature for the diazotization and coupling reactions may range from $-10°$ C. to $+50°$ C., preferably from $0°$ C. to $30°$ C.

Hence, this invention preferably relates to compositions comprising dyestuffs of formula (I) of the abovesaid constitutions, which contain one or more dyestuffs of formula (I) prepared according to the above-described new process.

The aqueous dyestuff solutions or suspensions obtained according to the novel process are directly used, optionally after addition of buffer substances, for the preparation of the dyeing compositions of the invention. The dyestuff solutions or suspensions obtained by this process, which contain organic solvents only or other solvents, too, are freed from the organic solvents, for example by heating them in vacuo or, if required or desired, they are spray-dried.

Organic solvents may advantageously be used for the synthesis, for example if the diazotizable organic amine or the coupling component is too sparingly soluble in water only, and speedy and complete diazotization and coupling reactions only take place in the presence of an organic solvent.

The solutions or suspensions of the dyestuffs of formula (I) obtained by this synthesis contain from 10 to 80% by weight of dyestuff but they do not contain any inorganic salts, unless such inorganic salts are already contained in the starting products. The suspension may be diluted with water to such an extent that the solutions obtained therefrom have a dyestuff content of from 10 to 45% by weight. Solutions having a dyestuff content less than 45% can be concentrated to reach a content of 45% by adding dry dyestuff obtained by drying part of the same solution or suspension or by distilling off water and/or solvents in vacuo. The highly concentrated compositions may, of course, also be prepared by dissolving the dyestuff powder, that has been obtained by drying this solution or suspension, to provide a correspondingly highly concentrated aqueous dyestuff solution and then adding buffer substances thereto.

Since the dyestuffs contained in the compositions of the invention need not be isolated by salting out, there is no production of mother liquors which have a very high content of salts or even are saturated with salts. Also, with the salt content of the compositions being nil or very low and no need for salts to standardize the dyestuff powders, the salt content of the waste waters coming from the dyestuff user is considerably reduced.

Hence, the advantage of the dyestuff compositions of the invention is that they contain no salt coming from the synthesis. The salt content merely depends on the purity of the starting components. Another advantage is the mild manufacturing conditions using no excess acid, which is particularly useful with components containing such kind of reactive groups which are sensitive to acids. Difficulties are only liable to arise if complete diazotization and coupling reactions require working in a pH-range which also accelerates the reaction speeds of possible side reactions, such as the hydrolysis of chlorine linked to heterocycles or the reaction of reactive groups with the diazotizable amine. Nonetheless, in most of these special cases, a careful checking of the temperature and/or an alternatingly portionwise addition of one or both components and of the sodium nitrite will result in satisfactory yields.

The reactive group Z is understood to contain one or more reactive groups or substituents capable of being split off under the reaction while forming covalent bonds, with the hydroxy groups of the cellulose when applying the dyes onto cellulosic material in the presence of acid-binding agents and, optionally, under the action of heat, or, when applying the dyes onto natural or synthetic polyamide fibers, with the NH-groups of these fibers. These fiber-reactive groupings are known in the art in a great variety.

Reactive groups of this type are, for example, heterocyclic radicals including 2 or 3 nitrogen atoms in the heterocycle, which carry at least one reactive substituent, such as a halogen atom, linked to a carbon atom, as for example of the halogenotriazinyl, halogenoquinoxaline, halogeno-pyridazine and halogeno-pyrimidine series, the acyl radicals of halogenated aliphatic carboxylic acids and unsaturated carboxylic acids, especially the reactive groups of the vinylsulfone series and the sulfamide derivatives thereof.

Dyestuff compositions of the invention containing one or more dyestuffs having a vinylsulfonyl, β-sulfatoethylsulfonyl, β-thiosulfatoethylsulfonyl or β-acetoxyethylsulfonyl-group, are preferred.

Examples of important reactive groups of the vinylsulfone series are, in addition to the vinylsulfone group itself, aliphatic sulfone groups containing, in the β-position with regard to the sulfone group, a group which can be split off by alkali, for example a halogen atom or an ester radical of an acid, such as the β-chloroethylsulfonyl, β-acetoxyethylsulfonyl, β-(3-sulfobenzoyloxy)-ethyl-sulfonyl, β-sulfatoethylsulfonyl, β-thiosulfatoethyl-sulfonyl, β-phosphatoethylsulfonyl and β-sulfatoethylsulfonylmethylamino groups, or the vinylsulfonylmethylamino group. Further important reactive radicals of the above-mentioned series are, for example, acyl groups of acrylic acid, of β-bromopropionic acid and of α,β-dibromo-propionic acid; the 3,6-dichloropyridazin-4-carbonyl, 2,3-dichloroquinoxalin-5- or -6-carbonyl, 2,4-dichloropyrimidin-5-carbonyl, 5-chloro-2-methylsulfonyl-6-methyl-pyrimid-4-yl, 2,4-difluoro-5-chloropyrimid-6-yl or, especially s-triazin-2-yl- and pyrimidin-2-yl or -4-yl groups, which contain a bromine or preferably chlorine atom or a sulfonic acid group in at least one of the remaining 2-, 4- or 6-position. If the triazine or pyrimidine ring carries only one of these reactive substituents, the remaining cyclic carbon atoms may carry non-reactive substituents. Examples of these non-reactive substituents are the hydroxy group, etherified hydroxy groups, primary amino groups and mono- or disubstituted amino groups, such as mono- and dialkylamino groups having up to 4 carbon atoms in the alkyl moiety, which may carry further substituents, such as hydroxy or alkoxy groups, or phenylamino groups which may preferably carry sulfonic acid groups and further substituents linked to the aromatic nucleus, for example the carboxy group. Etherified hydroxy groups are preferably the alkoxy groups having up to 4 carbon atoms. Specific examples of all these classes of non-reactive substituents are methylamino, ethylamino, dimethylamino, phenylamino, o-, m- and p-sulfophenylamino, the various disulfophenylamino and m- and p-carboxyphenylamino groups.

Fiber-reactive azo dyestuffs of formula (I), which are suitable for liquid dyestuff compositions of this type, according to the invention are known for example from the following publications: German Offenlegungsschriften Nos.:
1,544,499; 1,544,512; 1,544,517; 1,544,538; 1,544,542; 1,544,547; 1,619,491; 1,769,091; 1,793,301; 1,795,086; 1,804,524; 1,619,519;
German Auslegeschriften Nos.:
1,109,807; 1,156,914; 1,186,160; 1,204,762; 1,232,294; 1,274,764; 1,289,211;
German Patent Specifications Nos.:
436,179; 1,062,367; 1,103,483; 1,206,107; 1,248,188; 1,282,213; 1,150,163; 1,256,622;
Belgian Patent Specifications Nos.:
572,491; 578,742; 578,933; 592,213; 590,519; 597,730; 598,831; 609,091; 673,572; 673,573;
French Patent Specifications Nos.:
1,512,646; 1,160,909;
Swiss Patent Specification No.:
466,455.

Suitable for the compositions of the invention are all the buffer substances which are not capable of a chemical reaction, that would reduce the color yield, with the fiber-reactive group Z, such as with the $\beta$-sulfatoethylsulfonyl group or the vinylsulfonyl analog thereof, for example sodium and potassium acetate, sodium and potassium oxalate, the acid sodium and potassium salts of phosphoric acid, mixtures of the various sodium or potassium salts of phosphoric acid, and sodium borate, among which sodium borate and disodium hydrogenophosphate and sodiumdihydrogenophosphate are preferred.

The mechanism of the reaction of reactive dyes with cellulose fibers is generally known. Thus, for example, in the reactive dyes of the vinyl-sulfone type, the formation of the covalent bond between the fiber substrate and the dyestuff molecule according to the reaction (4) of the below-mentioned scheme 1 — after conversion of the $\beta$-sulfatoethylsulfonyl group into the vinylsulfonyl group in the presence of alkaline agents according to reaction (1) — brings about the known good fastness properties of the dyeings produced with these reactive dyes.

The same applies, for example, to reactive dyes having a halogeno-triazinyl group, in which the covalent bond with the fiber is caused according to reaction (6) of the scheme 2.

Scheme 1:

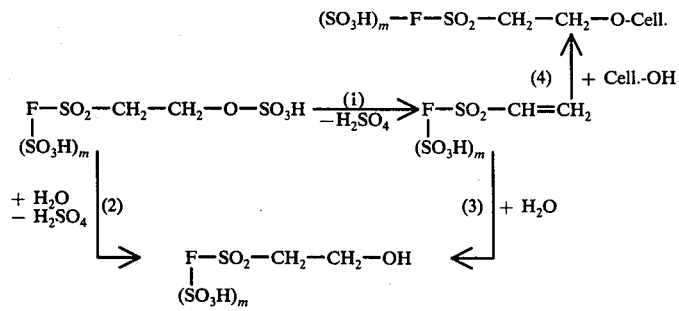

Scheme 2:

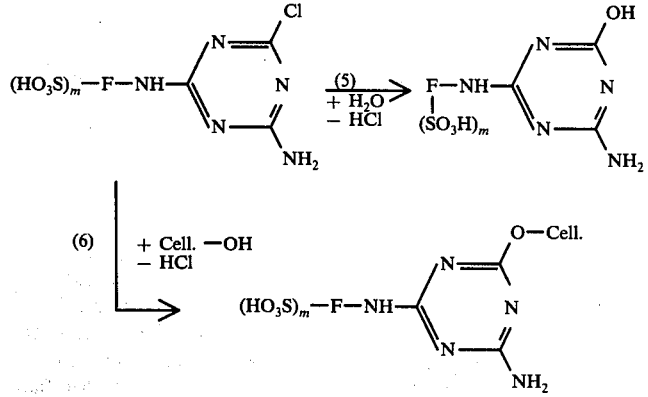

in which schemes F stands for the rest of the dyestuff molecule and m is defined as above, and Cell.—OH stands for cellulose.

For example, when using the reactive dyes having a β-sulfato-ethylsulfonyl group, it is however known that this reactive group, as does the vinylsulfonyl form with water, reacts not only in the presence of alkaline agents but also in an acid medium in a reaction according to (2) or (3) of the scheme, running concurrently with the dyeing reaction (4) itself, to provide the β-hydroxyethylsulfonyl group which is only sparingly reacting with the fiber substrate.

The hydrolysis (2) and the addition of water (3) are practically not reversible under the dyeing conditions and therefore reduce the color yield.

For this reason, water-soluble reactive dyes are generally prepared in such a manner that the above-mentioned separation and drying of the reactive dyes from the reaction solution immediately follows the synthesis in order to avoid loss in tinctorial strength for the above reasons.

It was the more surprising to find that neutral to weakly acid aqueous buffered solutions of reactive dyes of formula (I) are stable over a prolonged period of time without loss in tinctorial strength. Even after storage for several months, for example for 6 months at room temperature, or for several weeks, for example for 8 weeks, at 50° C., the aqueous solutions of the dyestuffs of formula (I) obtained according to the invention provide dyeings and prints of unaltered color intensity.

After having been diluted with water and optionally after addition of the current dyeing auxiliaries or accordingly of thickening agents and optionally printing auxiliaries usual in printing, the dyeing compositions of the invention are suitable, in a manner usual and generally known for reactive dyes, for the dyeing and printing of fibrous materials made of wool, silk, polyamide fibers, and natural or regenerated cellulose or of fiber blends containing one or more of the said fibers types.

The following Examples illustrate the invention, the parts and percentages being by weight unless stated otherwise.

EXAMPLE 1

32.5 Parts of 2-methoxy-4-(β-sulfatoethylsulfonyl)-5-methyl-aniline and 31.8 parts of 1-acetoacetylamino-2-methoxy-5-methyl-benzene-4-sulfonate of ammonia were introduced while stirring into 140 parts of water of 5° C. The addition of 17.3 parts of 40% sodium nitrite solution immediately resulted in a quantitative yield of the dyestuff which, in the form of the free acid, corresponds to the formula (II)

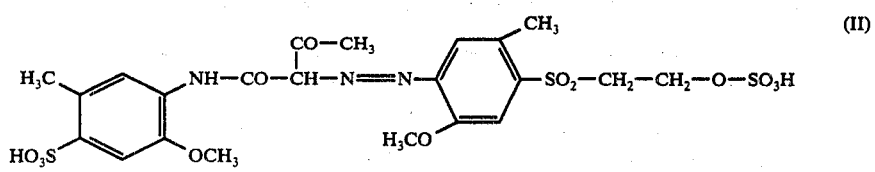

The pH-value of the solution rose from 2.8 to 5.5. The addition of 5 parts of disodium hydrogeno phosphate and 28 parts of water resulted in 262 parts of a composition containing 25% of the dyestuff of formula (II) and having a pH of 6.3.

2 Parts each of this pH-stabilized solution were used to prepare a dyebath, a padding liquor or a printing paste in the known and usual manner, which was then applied and fixed on cotton in the manner usual for reactive dyes to provide yellow dyeings and prints that had the same color intensity as those produced with equally concentrated dyebaths, padding liquors or printing pastes prepared with 1 part of a powder brand containing 50% of the dyestuff.

This color intensity of the prints and dyeings was unchanged even after the above-said novel aqueous composition had been stored for 6 weeks at 50° C. in a closed container.

EXAMPLE 2

34.1 Parts of 2-amino-5-(β-sulfatoethylsulfonyl)-hydroquinone dimethyl ether and 25.4 parts of 1-(4'-sulfophenyl)-3-methyl-5-hydroxy-pyrazole were suspended in 141.5 parts of water of 20° C. while stirring. The pH of the suspension was adjusted to 4.5 by dropwise adding 30 parts by volume (25.5 parts) of 5N sodium hydroxide solution. The addition of 6.9 parts of sodium nitrite raised the pH only slightly so that the pH was at 5 at the end of the coupling reaction. 233.4 Parts of a solution of the dyestuff were obtained which, in the form of the free acid, corresponds to the formula (III)

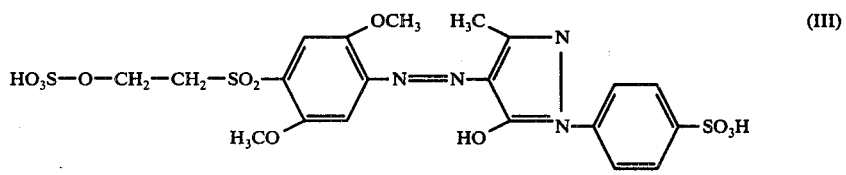

After addition of 9 parts of sodium acetate, the solution contained 25% of dyestuff and had a pH of 5.5.

2 Parts of this pH-stabilized solution were each used to prepare a dyebath, a padding liquor or a printing paste in the known and usual manner, which was then applied and fixed on cotton in the manner usual for reactive dyes to provide yellow dyeings and prints which had the same color intensity as those produced with equally concentrated dyebaths, padding liquors or printing pastes prepared with 1 part of a powder brand containing 50% of the dyestuff.

This color intensity of the prints and dyeings was unchanged even after the above-said novel aqueous composition had been stored for 6 weeks at 50° C. in a closed container.

EXAMPLE 3

28.1 Parts of 4-aminophenyl-β-phosphatoethylsulfone and 28.1 parts of 2-acetylamino-8-naphthol-6-sulfonic acid were stirred in 150 parts of water of 10° C., and 6.9 parts of sodium nitrite were added portionwise thereto, while the pH rose from 3.2 to 5.2 and the reaction temperature to 22° C. The addition of 7 parts of disodium hydrogenophosphate resulted in 220 parts of a solution containing 26% of the dyestuff which in the form of the free acid corresponds to the formula (IV)

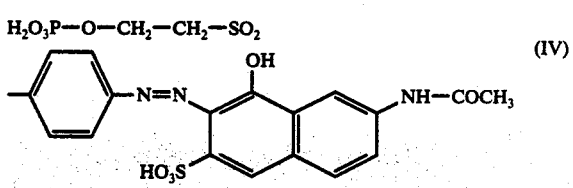

(IV)

and which had a pH of 6.2.

2 Parts each of this pH-stabilized solution were used to prepare a dyebath, a padding liquor or a printing paste in the known and usual manner, which was then applied and fixed on cotton in the manner usual for reactive dyes to provide orange dyeings and prints which had the same color intensity as those produced with equally concentrated dyebaths, padding liquors or printing pastes prepared with 1 part of a powder brand containing 52% of the dyestuff.

This color intensity of the prints and dyeings was unchanged even after the above-said novel aqueous composition had been stored for 6 weeks at 50° C. in a closed container.

EXAMPLE 4

40 Parts of 3-(4'-aminobenzoylamino)-β-sulfatoethylsulfonylbenzene and 40.5 parts of 1-acetylamino-β-naphtol-3,6-sulfonic-acid (disodium salt) were stirred at 20° C. in 185 parts of water, and 6.9 parts of sodium nitrite were added. After stirring had been continued for 1 hour, 20 parts by volume (17 parts) of 5N sodium hydroxide solution were added so as to carry out the coupling reaction at a pH of about 4. Stirring was continued for 15 minutes and the pH was adjusted to 6.2 by adding 8 parts of sodium borate. The addition of 12 parts of water resulted in 309.4 parts of a solution containing 25% of the dyestuff of the formula (V)

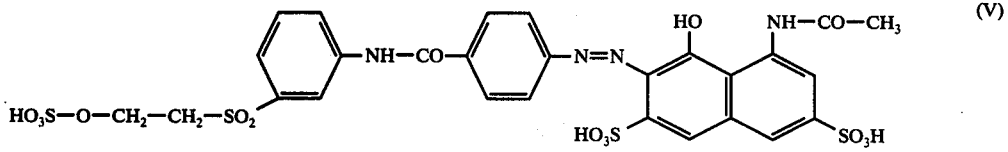

2 Parts each of this pH-stabilized solution were used to prepare a dyebath, a padding liquor or a printing paste in the known and usual manner, which was then applied and fixed on cotton in the usual manner to provide red dyeings and prints which had the same color intensity as those produced with equally concentrated dyebaths, padding liquors or printing pastes obtained with 1 part of a powder brand containing 50% of the dyestuff.

This color intensity of the prints and dyeings was unchanged even after the above-said novel aqueous composition had been stored for 6 weeks at 50° C. in a closed container.

EXAMPLE 5

29.7 Parts of 2-amino-4-β-sulfatoethylsulfonyl-phenol and 40.5 parts of the disodium salt of 1-acetylamino-8-naphthol-3,6-disulfonic acid were stirred in 300 parts of water at 15° C., and 6.9 parts of sodium nitrite were added. Stirring was continued for several hours until no more diazonium compound could be established; the pH remained almost unchanged at about 5. 25 Parts of copper sulfate and 10 parts of disodium hydrogenophosphate and 8 parts of sodium dihydrogenophosphate were then introduced into the reaction mixture. The complex compound formed at once, while the temperature rose by about 5° C. The addition of further 65.9 parts of water resulted in 486 parts of a solution containing 15% of the dyestuff of the formula (IV)

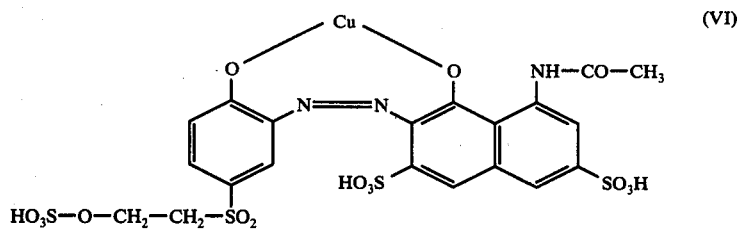

and having a pH value of 5.4.

3 Parts of this pH-stabilized solution were used to prepare a dyebath, a padding liquor or a printing paste in the known and usual manner, which was then applied and fixed on cotton in the manner usual for reactive dyes to provide red violet dyeings and prints which had the same color intensity as those produced with equally concentrated dyebaths, padding liquors or printing pastes obtained with 1 part of a powder brand containing 45% of the dyestuff.

This color intensity of the prints and dyeings was unchanged even after the above-said novel aqueous composition had been stored for 6 weeks at 50° C. in a closed container.

EXAMPLE 6

28.1 Parts of 4-aminophenyl-β-sulfatoethylsulfone and 28.4 parts of 1-(4'-sulfophenyl)-3-carboxy-5-hydroxy-pyrazole were introduced while stirring into 200 parts of water of 20° C. After addition of 6 parts of sodium carbonate and 8 parts of disodium hydrogenophosphate, 17.3 parts of a 40% sodium nitrite solution were added dropwise while stirring within 10 minutes at a pH of 4.6. At 20° C., stirring was continued for 1 hour, further 8 parts of disodium hydrogenophosphate were added, and the mixture was diluted with 33.2 parts of water.

329 Parts of a solution were obtained which contained 17.5% of the dyestuff of the formula (VII) and had a pH of 6.5.

and having a pH of 5.5.

2 Parts each of this pH-stabilized solution were used to prepare a dyebath, a padding liquor or a printing paste in the known and usual manner, which was then applied and fixed on cotton in the manner usual for reactive dyes to provide yellow dyeings and prints that had the same color intensity as those produced with equally concentrated dyebaths, padding liquors and printing pastes obtained with 1 part of a powder brand

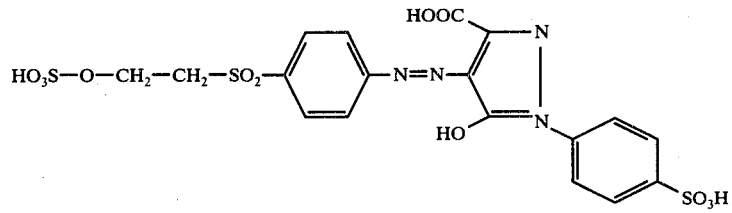

(VII)

2 Parts each of this pH-stabilized solution were used to prepare a dyebath, a padding liquor or a printing paste in the known and usual manner which was then applied and fixed on cotton in the manner usual for reactive dyes to provide yellow dyeings and prints which had the same color intensity as those produced with equally concentrated dyeing baths, padding liquors or printing pastes obtained with 1 part of a powder brand containing 35% of the dyestuff.

This color intensity of the prints and dyeings was unchanged even after the above-said novel aqueous composition had been stored for 6 weeks at 50° C. in a closed container.

EXAMPLE 7

40 Parts of 3-(4'-aminobenzoylamino)-4-sulfatoethyl-sulfonyl-benzene and 28.4 parts of 1-(4'-sulfophenyl)-3-carboxy-5-hydroxy-pyrazole were introduced while stirring into 200 parts of water of 20° C., and after addition of 12.1 parts of 33% sodium hydroxide solution and 8 parts of disodium hydrogenophosphate, 17.3 parts of 40% sodium nitrite solution were added dropwise. The mixture was stirred for 1 hour at 20°–25° C., while the pH remained practically unchanged at about 5. Further 6 parts of disodium hydrogenophosphate and 65.2 parts of water were then added to provide 328 parts of a dyestuff solution containing 21.3% of the dyestuff of the formula (VIII)

containing 43% of the dyestuff.

This color intensity of the prints and dyeings was unchanged even after the above-said novel aqueous composition had been stored for 6 weeks at 50° C. in a closed container.

EXAMPLE 8

25.4 Parts of 1-(4'-sulfophenyl)-3-methyl-5-hydroxy-pyrazole were introduced into 150 parts of water of 25° C. and dissolved by adding 5.5 parts of sodium carbonate, whereupon a pH of 5.4 was reached. After addition of 32.5 parts of 2-methoxy-4-($\beta$-sulfatoethyl-sulfonyl)-5-methyl-aniline and 4 parts of disodium hydrogenophosphate, the solution was cooled to 10° C. Within 10 minutes, 20 parts by volume (17 parts) of 5N sodium nitrite solution were added dropwise. The diazotization and coupling reactions were complete immediately after addition of sodium nitrite, while the pH of the solution was 4.9. The addition of 3.8 parts of disodium hydrogenophosphate resulted in 236 parts of a dyestuff composition containing 25% of the dyestuff of the formula (IX) and having a pH of 6.4.

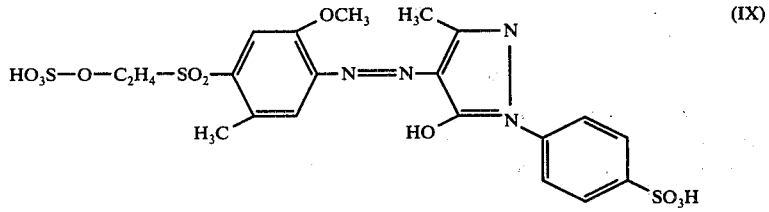

(IX)

2 Parts each of this pH-stabilized solution were used to prepare a dyebath, a padding liquor or a printing paste in the known and usual manner, which was then applied and fixed on cotton in the manner usual for reactive dyes to provide yellow dyeings and prints which had the same color intensity as those produced

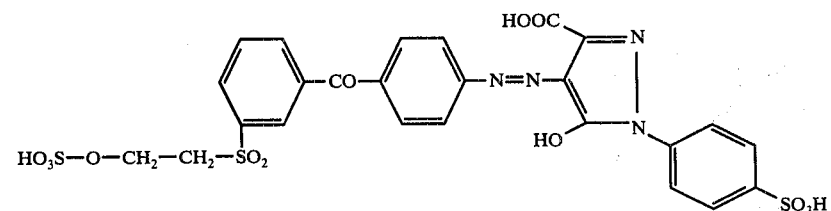

(VIII)

with equally concentrated dyebaths, padding liquors or printing pastes obtained with 1 part of a powder brand containing 50% of the dyestuff.

This color intensity of the prints and dyeings as unchanged even after the above-said novel aqueous composition had been stored for 6 weeks at 50° C. in a closed container.

EXAMPLE 9

50.8 Parts (0.2 mol) of 1-(4'-sulfophenyl)-3-methyl-pyrazolone-(5) were dissolved in a mixture of 123 parts of water and 53 parts of ε-caprolactam at room temperature by adding 10.6 parts of anhydrous sodium carbonate, while a pH of 5.4 was reached. Then, 32.5 parts (0.1 mol) of 1-amino-2-methoxy-5-methyl-benzene-4-β-sulfatoethyl-sulfone and 34.1 parts (0.1 mol) of 1-amino-2,5-dimethoxy-benzene-4-β-sulfatoethylsulfone were added and the mixture was cooled to 10° C. by external cooling. The addition of 3 parts of disodium hydrogenophosphate adjusted the pH to 4.4. Then 13.8 parts of sodium nitrite were added within 10–15 minutes, which resulted in a yellow dyestuff solution. The pH rose to 5.0, and coupling was complete immediately after the addition of sodium nitrite. 298 Parts of a dyestuff solution were obtained, which contained 19.7% of the dyestuff of the formula (X)

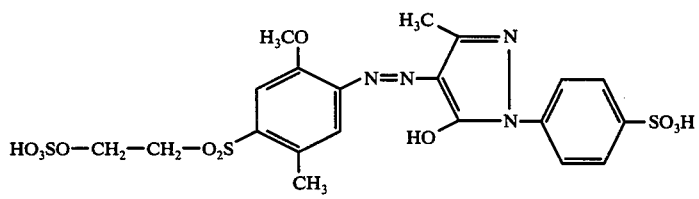

and 20.3% of the dyestuff of the formula (XI)

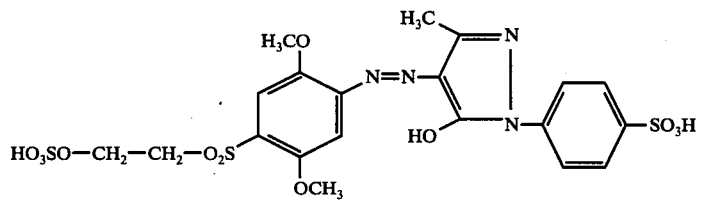

in the form of their sodium salts.

1 Part of this pH-stabilized solution was used to prepare, in the known and usual manner, a dyebath, padding liquor or printing paste which was then applied and fixed on cotton in a manner usual for reactive dyes to provide yellow dyeings and prints. These had the same good color intensity as those produced with equally concentrated dyebaths, padding liquors or printing pastes prepared with 1 part of a powder brand containing also 19.7% of the dyestuff (X) and 20.3% of the dyestuff (XI).

This color intensity of the prints and dyeings was uncharged even after the above-said novel aqueous composition had been stored for 3 months at 20° C. in a closed container.

EXAMPLE 10

38.8 Parts (0.1 mol) of a coupling component of the formula (XII)

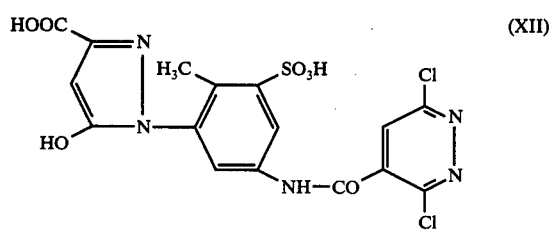

in the form of its disodium salt and 17.3 parts (0.1 mol) of ortho-anilic acid and 4 parts of disodium hydrogenophosphate were introduced into a mixture of 85.8 parts of water and 28.3 parts of ε-caprolactam, and the mixture was cooled to 5° C. 6.9 Parts of ground sodium nitrite were slowly added while stirring to yield immediately a yellow dyestuff solution; the pH-value rose to 5. After coupling was complete, another 3 parts of disodium hydrogenophosphate were added, whereupon the pH rose to 6.2.

191 Parts of a dyestuff solution were obtained which contained 30% of the dyestuff of the formula (XIII)

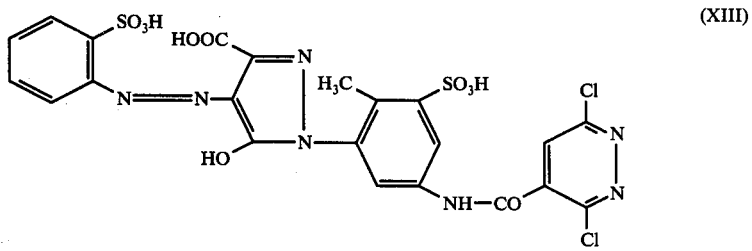

in the form of its sodium salt.

3 Parts of this pH-stabilized solution were used to prepare, in the known and usual manner, a dyebath, a padding liquor or a printing paste which was then applied and fixed on cotton in a manner usual for reactive dyes to provide yellow dyeings and prints. These had the same good color intensity as those produced with equally concentrated dyebaths, padding liquors or printing pastes prepared with 2 parts of a powder brand containing 45% of the dyestuff (XIII).

This color intensity of the prints and dyeings was unchanged even after the above-said novel aqueous composition had been stored for 3 months at 20° C. in a closed container.

EXAMPLE 11

Following the procedure of Example 10 but using a mixture of 85.8 parts of water with 28.3 parts of tetramethyl-urea resulted in an equally concentrated solution of the dyestuff of formula (XIII) which had the same properties.

EXAMPLE 12

A mixture of 206 parts of water and 70 parts of hexamethylphosphoric acid triamide was cooled to 10° C. and blended while stirring with 47.25 parts (0.1 mol) of 2-amino-4-[4'-chloro-6'-(3''-sulfophenylamino)-s-triazin-2-yl]-benzene-sulfonic acid in the form of its sodium salt and 28.4 parts (0.1 mol) of 1-(4'-sulfophenyl)-pyrazolone-(5)-3-carboxylic acid. After addition of 4 parts of disodium hydrogeno-phosphate, 17.25 parts of an aqueous 40% solution of sodium nitrite were slowly added dropwise while further stirring to yield a yellow dyestuff solution whose pH rose to 5.2 during the addition of nitrite. After coupling was complete, another 4 parts of disodium hydrogenophosphate were added to adjust the pH to 6.3.

384 Parts of a dyestuff solution were obtained which contained 20% of the dyestuff of the formula (XIV)

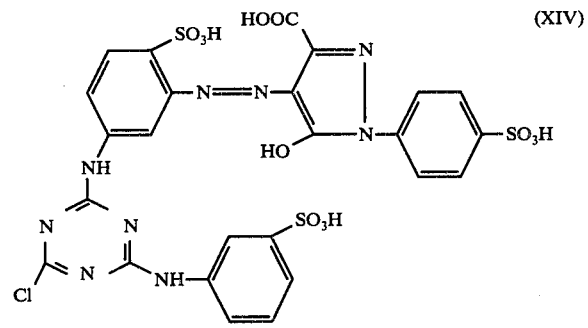

in the form of its tetrasodium salt.

2 Parts each of this pH-stabilized solution were used to prepare, in the known and usual manner, a dyebath, a padding liquor or a printing paste which was then applied and fixed on cotton in a manner usual for reactive dyes to provide yellow dyeings and prints. These had the same good color intensity as those obtained with equally concentrated dyebaths, padding liquors or printing pastes obtained with 1 part of a power brand containing 40% of the dyestuff of formula (XIV).

This color intensity of the prints and dyeings was unchanged even after the above-said novel aqueous composition had been stored for 3 months at 20° C. in a closed container.

EXAMPLE 13

17.3 Parts of sulfanilic acid were introduced into a solution of 57 parts of the disodium salt of 1-hydroxy-8-N-(2'-methylsulfonyl-5'-chloro-6'-methyl-pyrimid-4'-yl)-amino-naphthalene-3,6-disulfonic acid in 250 parts of water. After cooling to 0°-5° C., 6.9 parts of sodium nitrite were added while stirring, whereupon the pH rose from 2.6 to 5.0. Then, 4 parts of sodium dihydrogenophosphate, 8 parts of disodium hydrogenophosphate and another 11 parts of water were added to yield 354 parts of a solution containing 20% of the dyestuff of the formula (XV)

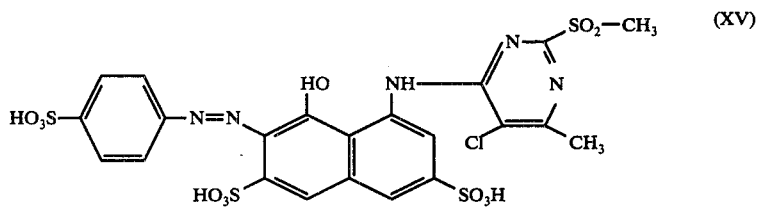

and having a pH of 6.1.

2 Parts each of this pH-stabilized solution were used to prepare, in the known and usual manner, a dyebath, a padding liquor or a printing paste which was then applied and fixed on cotton in a manner usual for reactive dyes to provide red dyeings and prints. These had the same good color intensity as those produced with equally concentrated dyebath, padding liquors or printing pastes prepared with 1 part of a powder brand containing 40% of the dyestuff.

This color intensity of the prints and dyeings was unchanged even after the above-said novel aqueous composition had been stored for 3 months at 20° C. in a closed container.

EXAMPLE 14

25.3 Parts of 1-aminobenzene-2,4-disulfonic acid were introduced into a solution of 63.6 parts of the sodium salt of 1-hydroxy-β-m-(2',4',5'-trichloropyrimid-6'-ylamino)-benzoylamino-naphthalene-3,6-disulfonic acid in 250 parts of water. After addition of 5.3 parts of sodium carbonate, 6.9 parts of sodium nitrite were added while stirring at 5° C. and at a pH of 3.0. While the dyestuff formed speedily, the pH rose to 4.8. The addition of 10 parts of disodium hydrogenophosphate and another 12 parts of water resulted in 363 parts of a dyestuff solution which contained 25% of the dyestuff of the formula (XVI)

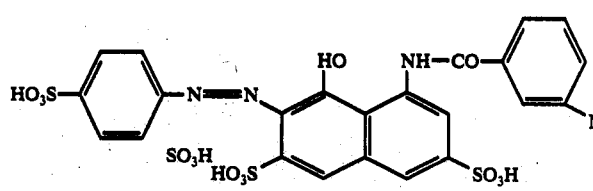

and had a pH of 6.3.

2 Parts of this pH-stabilized solution were used to prepare, in the known and usual manner, a dyebath, a padding liquor or a printing paste which was then applied and fixed on cotton in a manner usual for reactive dyes to provide red dyeings and prints. These had the same good color intensity as those produced with equally concentrated dyebaths, padding liquors or printing pastes prepared with 1 part of a powder brand containing 50% of the dyestuff.

This color intensity of the prints and dyeings was unchanged even after the above-said novel aqueous composition had been stored for 3 months at 20° C. in a closed container.

EXAMPLE 15

31.3 Parts of 2-naphthylamino-6,8-disulfonic acid and 8.4 parts of sodium hydrogenocarbonate were introduced into a solution of 38.4 parts of the sodium salt of 1-4'-(β-sulfatoethyl-sulfonyl)-phenyl-3-methyl-5-hydroxy-pyrazole in 85 parts of water and 26 parts of ε-caprolactam. At 10° C., 2 parts of disodium hydrogenophosphate were added to raise the pH to 4.6. Then 6.9 parts of sodium nitrite was stirred into this mixture. The dyestuff formed speedily with the pH hardly rising. 188 Parts of a solution were obtained which contained 40% of the dyestuff of the formula (XVII)

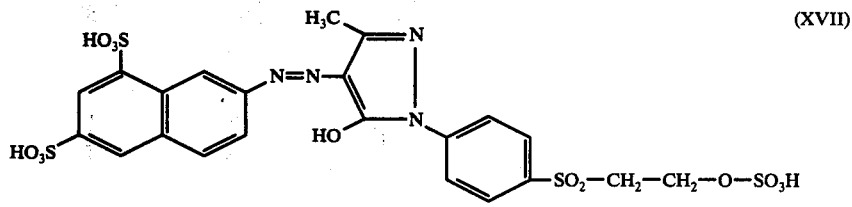

and had a pH of 4.9.

1 Part of this pH-stabilized solution were used to prepare, in the known and usual manner, a dyebath, a padding liquor or a printing paste which was then applied and fixed on cotton in a manner usual for reactive dyes to provide yellow dyeings and prints. These had the same good color intensity as those produced with equally concentrated dyebaths, padding liquors or printing pastes prepared with 1 part of a powder brand containing 40% of the dyestuff.

This color intensity of the prints and dyeings was unchanged even after the above-said novel aqueous composition had been stored for 3 months at 20° C. in a closed container.

In the same analogous manner as disclosed in the preceding Examples, dyeing compositions of the invention can be prepared using the dyestuffs known from German Offenlegungsschrift No. 1,150,163; Ex. 1, German Offenlegungsschrift No. 1,804,524; Ex. 4 and 5, German Offenlegungsschrift No. 1,769,091; Ex. 6, German Patent No. 1,248,188; Ex. 1, German Patent No. 1,289,930; Ex. 19, U.S. Patent No. 3,419,541; Table-Ex. 11, German Pat. No. 1,204,762; Ex. 38, German Pat. No. 960,534; Table-Ex. 8, on page 9, and Belgian Pat. No. 598,831; Ex. 4, and starting from the diazo and coupling components to be seen from the azo dyes.

We claim:

1. A stable, liquid aqueous composition of fiber-reactive dye consisting essentially of 5 to 45% by weight of 1, 2, 3, or 4 dyestuffs which in the free acid form have the formula $$(HO_3S)_m\text{-}F\text{-}Z_n$$

in which F is the chromophoric radical of a monoazo dyestuff, Z is a fiber-reactive group selected from the group consisting of vinyl sulfonyl, β-chloroethyl-sulfonyl, β-acetoxyethyl-sulfonyl, β-(3-sulfobenzoyloxy)-ethyl-sulfonyl, β-sulfatoethyl-sulfonyl, β-thiosulfato-ethyl-sulfonyl, β-phosphatoethyl-sulfonyl, β-sulfatoe-thylsulfonyl-methylamino and vinylsulfonyl-methylamino, m is an integer of from 1 to 8 and n is an integer of from 1 to 3, water and 1, 2, 3, or 4 buffer substances selected from the group consisting of sodium acetate, potassium acetate, sodium oxalate, potassium oxalate, an acid sodium salt of phosphoric acid, and acid potassium salt of phosphoric acid, a mixture of the sodium or potassium salts of phosphoric acid and sodium borate, said composition having a pH-value of from 3 to 7 and being characterized by said dyestuff having been prepared in an aqueous, aqueous organic or organic medium by reacting a stoichiometric amount of an aromatic amine and of a coupling component, the amine or the coupling component or both having a free acid sulfo group, with a stoichiometric amount of an alkali metal nitrite and without addition of an acid.

2. A dyeing composition according to claim 1 with a content of from 1 to 10% by weight of buffer substance.

3. A dyeing composition according to claim 1 with a content of from 1 to 6% by weight of buffer substance.

4. A composition as recited in claim 1, wherein Z is a fiber-reactive group selected from the group consisting of vinylsulfonyl, β-sulfatoethylsulfonyl, β-thiosulfatoe-thylsulfonyl and β-acetoxyethyl-sulfonyl.

5. A composition as recited in claim 1, wherein the buffer substance is selected from the group consisting of sodium borate, disodium hydrogenophosphate and sodium dihydrogenophosphate.

* * * * *